July 13, 1954      H. L. BROCK      2,683,382

TRACTOR PARKING BRAKE CONTROL

Filed Nov. 6, 1951

H. L. BROCK
INVENTOR.

BY E.C. McRae
J. R. Faulkner
G. H. Oster

ATTORNEY

Patented July 13, 1954

2,683,382

UNITED STATES PATENT OFFICE 2,683,382

TRACTOR PARKING BRAKE CONTROL

Harold L. Brock, Detroit, Mich., assignor to Ford Motor Company, Dearborn, Mich., a corporation of Delaware Application November 6, 1951, Serial No. 255,111

4 Claims. (Cl. 74—533)

This invention relates generally to tractors, and particularly to a tractor parking brake control.

It is an object of the present invention to provide a tractor parking brake control facilitating setting the tractor brake in applied or parked position and also simplifying the release of the brake from its parked position. A further object is to provide control means for a tractor brake selectively movable between two positions and thereafter automatically operable upon depression of the brake pedal to either lock the brake in its applied or parked position or to release the brake from its applied position depending upon the preselected position of the control means.

Other objects and advantages of this invention will be made more apparent as this description proceeds, particularly when considered in connection with the accompanied drawings, wherein.

Figure 1:
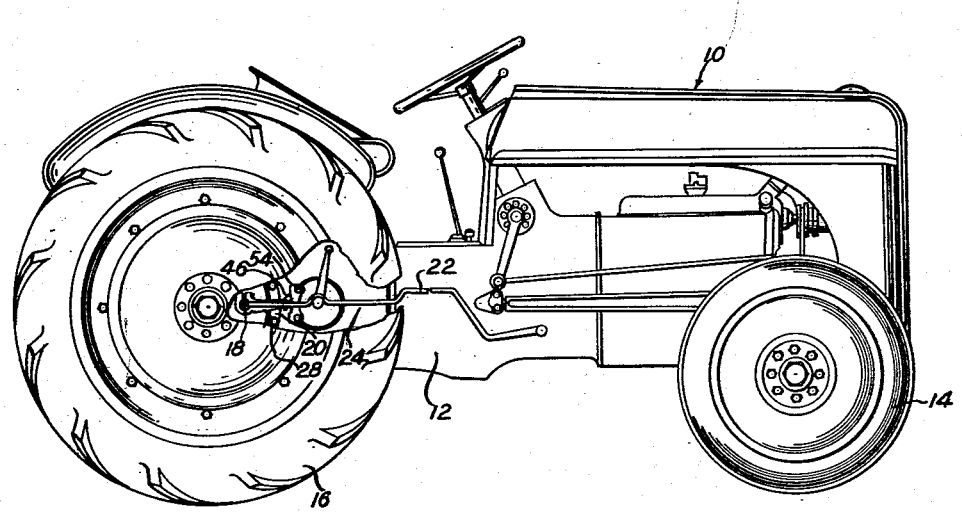
Figure 1 is a side elevational view of a tractor partly broken away to show the brake control mechanism of the present invention.

Referring now particularly to the drawings, Figure 1 illustrates a tractor 10 having a chassis 12 and front and rear wheels 14 and 16 respectively. The rear wheels 16 are provided with conventional brake units (not shown) each adapted to be applied by the rotation of a horizontal transversely extending actuating shaft 18. The inner end of each actuating shaft 18 is journaled in a bracket 20 secured to the chassis 12, and the shaft is adapted to be rotated by means of a brake pedal 22 rigidly carried at the forward end of a brake pedal arm 24, the rearward end of which is clamped to the actuating shaft 18 by means of a bolt 26. The structure thus far described is conventional.

A parking brake control arm 28 is non-rotatably secured to the brake actuating shaft 18 between the bracket 20 and the connection of the brake pedal arm 24 to the shaft. The rearward end of the arm 28 is keyed to the actuating shaft 18 at 30 and is clamped to the shaft by means of bolt 32 extending through the split portion 34 of the arm.

The arm 28 projects in a forward direction from the actuating shaft 18 and is generally horizontal, and terminates in an enlarged boss 36 formed with a transverse bore 38 therethrough. A pin 40 is rotatably mounted in the bore 38 and extends beyond opposite sides of the boss 36 of the arm. The inner end of the rotatable pin 40 is formed with an enlarged serrated portion 42 and with a head 44. Non-rotatably mounted upon the serrated portion 42 of the pin 40 is a pawl 46. In its applied position the pawl 46 extends diagonally upwardly and forwardly from the pin 40 and is formed at its outer end with teeth 48 and 50. The teeth 48 and 50 of the pawl 46 are adapted to engage the rearward toothed edge 52 of a rack member or ratchet 54 fixedly mounted upon the side of the tractor chassis 12 by means of bolts 56. The toothed edge 52 of the rack member is slightly curved to provide the proper engagement with the teeth of the pawl member 46.

Figure 3:
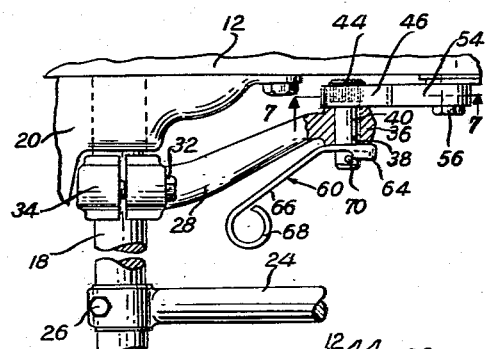
Figure 3 is a plan view, partly in section, of the construction shown in Figure 2.
Figure 5:
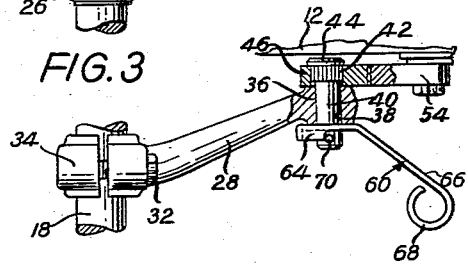
Figure 5 is a plan view, partly in section, of the construction shown in Figure 4.
Figure 6:
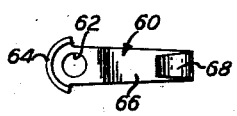
Figure 6 is a side elevational view of the control lever.
Figure 7:
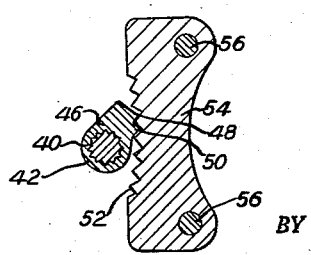
Figure 7 is a vertical cross-sectional view taken on the plane indicated by the line 7—7 of Figure 3.

Rotatably mounted upon the outer end of pin 40 is a control lever 60. The control lever 60 is best shown in Figures 5 and 6, and comprises a sheet metal stamping having an opening 62 formed in one end for receiving pin 40. An arcuate flange 64 is formed at the inner end of the lever concentric with opening 62 and extends angularly slightly less than 180 degrees. The opposite end of the control lever 60 comprises an overhanging portion 66 terminating in a rolled end 68. As best seen in Figures 3 and 5 the overhanging portion 66 of the lever is bent outwardly to provide clearance between the lever and the brake arm 28 when the lever is swung to the position shown in Figure 3.

An abutment pin 70 is rigidly mounted at the end of the pin 40 and projects a sufficient distance radially beyond one side of the pin 40 to be in the path of the arcuate flange 64 of the control lever 60 and to be engaged by an end of this flange. The opposite end of the pin 70 is short so as not to interfere with the movement of the arcuate flange 64 of the control lever.

*Operation*

The tractor rear wheel brake is adapted to be conventionally applied by depression of the foot pedal 22, Figure 1, resulting in clockwise rotation of the brake actuating shaft 18. When it is desired to park the tractor and to maintain the brake in its applied position, the pawl 46 is engaged with the rack member 54. To accomplish this the control lever 60 is manually rotated to the position shown in Figures 4 and 5 prior to application of the brake pedal 22. When the brake pedal is subsequently depressed and the actuating shaft 18 rotated in a clockwise direction, the brake control arm 28 is likewise swung in a clockwise direction and the pawl 46 pivotally supported at the outer end of the arm is held against the rack member 54 by means of the control arm 60. The overhanging portion 66 and the rolled end 68 of the control lever 60 are heavy enough to create a force tending to rotate pin 40 in a clockwise direction and to therefore urge the pawl 36 toward the rack member. This force is transmitted from the control lever 60 to the pin 40 carrying the pawl 36 by reason of the engagement between one end of the arcuate flange 64 on the control lever with the abutment pin 70 carried at the outer end of the rotatable pin 40. Consequently the pawl 46 moves downwardly along the toothed rearward edge of the rack member 54 as the brake pedal 22 is depressed, and when the brake pedal is released the teeth 48 and 50 on the pawl engage the teeth on the rack member effectively preventing reverse or counterclockwise rotation of the control arm 28 and the brake actuating shaft 18. The brake is thus locked in its applied or parked position.

Figure 2:
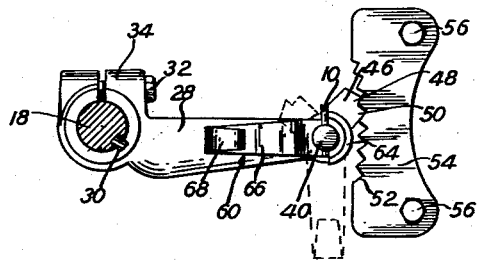
Figure 2 is an enlarged side elevational view of a portion of Figure 1, showing the parking brake control in position to release the brake upon depression of the foot pedal.
Figure 4:
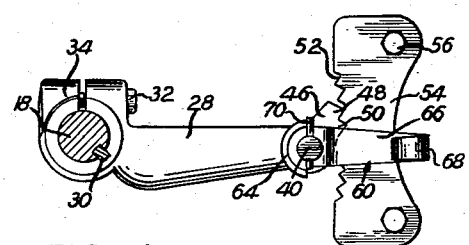
Figure 4 is a view similar to Figure 2 but showing the parking brake control in position to lock the brake in parked position upon depression upon the brake pedal.

When it is thereafter desired to release the tractor brake from its applied or parked position, the control lever 60 is first manually swung from the position shown in Figure 4 in a counterclockwise direction to the position shown in Figure 2. It will be noted that in this position the overhanging portion 66 of the control lever extends in the opposite direction from the rotatable pin 40, and by reason of the engagement of the end of the arcuate flange 64 on the control lever with the abutment pin 70 carried by the pivot pin 40, the control lever exerts a force tending to rotate the pin 40 and the pawl 46 in a counterclockwise direction. Due, however, to the angular relationship between the brake control arm 28 and the pawl 46, and the engagement between the pawl teeth 48 and 50 and the ratchet teeth 52, the weight of the control lever 60 is incapable of releasing the pawl from the ratchet. This is readily accomplished, however, by momentarily depressing the brake foot pedal 22 to slightly rotate the brake actuating shaft 18 and the brake control arm 28 in a clockwise direction to relieve the pressure between the pawl teeth 48 and 50 and the ratchet teeth 52. When the pressure between the teeth is thus relieved, the overhanging weight of the control lever 60 is effective to swing the pawl 46 from the position shown in solid lines in Figure 2 to the position shown in dotted lines. Release of the foot pedal then releases the brake from its applied position.

It will be apparent from the foregoing that the parking brake control of the present invention incorporates a control member adapted to be moved between two selected positions to condition the control mechanism either for subsequent locking of the tractor brake in parked position or for releasing the brake from a parked position. Inasmuch as the control lever 60 is freely rotatably mounted upon the pin 40, it can be moved between its two positions simply by a flick of the finger. Subsequent operation of the brake pedal automatically operates the parking brake control mechanism to achieve the desired result. It is thus unnecessary for the operator to manipulate any controls while he is applying the brake pedal to lock the brake in its parked position. The brake is positively held in its parked position and cannot be inadvertently released, yet may be rapidly and simply released by a simple operation.

In the illustrated embodiment of the invention, the arcuate flange 64 formed on the control lever 60 forms a pair of abutments spaced approximately 180 degrees from each other, and enables the control lever to be located horizontally for the most effective operation during brake application and brake release. With the provision of sufficient unbalanced weight on the control lever 60, however, it would of course be possible to vary the location of the abutments on the control lever to vary the angular movement of the lever between its preselected positions.

It will be understood that the invention is not to be limited to the exact construction shown and described, but that various changes and modifications may be made without departing from the spirit and scope of the invention, as defined in the appended claims.

What is claimed is:

1. A parking brake control for a vehicle brake having a horizontally disposed rotatable brake actuating shaft and manually operable means connected to such shaft to rotate the latter and apply the brake, comprising an arm rigidly mounted on said shaft, a vertically disposed rack fixedly mounted upon said vehicle adjacent said arm, a pawl pivotally mounted upon said arm for movement about a horizontal axis and pivotally movable into engagement with said rack, a control member having one end thereof mounted coaxially with said pawl and the free end thereof defining a handle portion, means providing a lost motion pivotal connection between said control member and said pawl, whereby said control member is free to pivot relative to said pawl only between two angularly spaced positions, said angularly spaced positions being respectively disposed on opposite sides of a vertical plane containing the axis of pivotal movement of said pawl when said pawl is engaged with said rack, the unbalanced mass of said control member being proportioned to gravitationally produce pivotal displacements of said pawl, when not restrained by said rack, toward said rack in said one position of said control member and away from said rack in said other position of said control member.

2. A parking brake control for a tractor brake having a horizontal rotatable brake actuating shaft and manually operable means connected to said shaft to rotate the latter and apply the brake, comprising an arm rigidly mounted upon said shaft, a generally vertically extending toothed rack fixedly mounted upon said tractor adjacent the end of said arm, a pin horizontally journalled in the outer end of said arm and projecting beyond the opposite sides of said arm, a pawl fixedly mounted upon one end of said pin and pivotally movable into engagement with said toothed rack to hold said arm in brake applied position, a control member having a hub portion pivotally mounted on the opposite end of said pin and a radially extending handle portion, means providing a lost motion pivotal connection between said control member and said pawl, whereby said control member is free to pivot relative to said pawl only between two angularly spaced positions, said angularly spaced positions being respectively disposed on opposite sides of a vertical plane containing the axis of pivotal movement of said pawl when said pawl is engaged with said rack, the unbalanced mass of said control member being proportioned to gravitationally produce pivotal displacements of said pawl, when not restrained by said rack, toward said rack in one position of said control member and away from said rack in said other position of said control member.

3. The structure defined by claim 2 which is further characterized in that the pivotal lost motion connection of said control member to said pawl includes an abutment projecting from one side of said opposite end of the pin, and a pair of angularly spaced abutments on said control member engageable with the abutment on said pin and limiting pivotal movement of said control member relative to said pin to a predetermined angular amount.

4. The structure defined by claim 2 which is further characterized in that the pivotal lost motion connection of said control member to said pawl includes an abutment projecting radially from said opposite end of the pin, and an arcuate flange on said hub portion of said control member, said flange being concentric with said pin and the ends thereof extending axially into the path of said abutment to limit movement of said control member relative to said pin to a predetermined angular amount.

References Cited in the file of this patent

UNITED STATES PATENTS

| Number | Name | Date |
|---|---|---|
| 169,190 | Perry | Oct. 26, 1875 |
| 740,863 | Jacobs | Oct. 6, 1903 |
| 803,024 | Steitz | Oct. 31, 1905 |
| 836,640 | Dunn et al. | Nov. 20, 1906 |
| 1,103,038 | Clemens | July 14, 1914 |
| 1,341,222 | Spinney | May 25, 1920 |
| 1,584,013 | Collins | May 11, 1926 |
| 1,947,405 | Camp | Feb. 13, 1934 |
| 2,127,920 | James | Aug. 23, 1938 |
| 2,612,059 | Allen | Sept. 30, 1952 |